United States Patent
Koren et al.

(10) Patent No.: US 8,555,104 B2
(45) Date of Patent: Oct. 8, 2013

(54) FREQUENCY ADAPTER UTILIZED IN HIGH-SPEED INTERNAL BUSES

(75) Inventors: Asaf Koren, Herzliya (IL); David Avishai, Nes-Ziona (IL); Limor Yonatani, Hod-HaSharon (IL); Yariv Aviram, Beit Yehoshua (IL); Jacob Harel, Hod-HaSharon (IL)

(73) Assignee: Broadcom Corporation, Irvine, CA (US)

( * ) Notice: Subject to any disclaimer, the term of this patent is extended or adjusted under 35 U.S.C. 154(b) by 310 days.

(21) Appl. No.: 12/686,714

(22) Filed: Jan. 13, 2010

(65) Prior Publication Data

US 2011/0173481 A1   Jul. 14, 2011

(51) Int. Cl.
*G06F 1/04* (2006.01)
*G06F 13/14* (2006.01)
*G06F 13/36* (2006.01)
*G06F 15/00* (2006.01)

(52) U.S. Cl.
USPC ............ 713/600; 710/305; 710/310; 370/235

(58) Field of Classification Search
None
See application file for complete search history.

(56) References Cited

U.S. PATENT DOCUMENTS

| | | | |
|---|---|---|---|
| 5,884,053 A | 3/1999 | Clouser et al. | |
| 6,442,642 B1 | 8/2002 | Brooks | |
| 6,633,944 B1 | 10/2003 | Holm et al. | |
| 6,633,994 B1 * | 10/2003 | Hofmann et al. | 713/600 |
| 6,810,460 B1 | 10/2004 | Kirkwood | |
| 6,857,037 B2 | 2/2005 | Messmer et al. | |
| 6,963,990 B2 | 11/2005 | Allen et al. | |
| 7,260,734 B2 * | 8/2007 | Labate et al. | 713/400 |
| 7,263,570 B2 | 8/2007 | Papa et al. | |
| 7,370,127 B2 | 5/2008 | Avishai et al. | |
| 2006/0140317 A1 * | 6/2006 | Di Gregorio | 375/354 |
| 2006/0282605 A1 * | 12/2006 | Avishai et al. | 710/315 |
| 2011/0173481 A1 * | 7/2011 | Koren et al. | 713/600 |

* cited by examiner

*Primary Examiner* — Kim Huynh
*Assistant Examiner* — Vincent Chang
(74) *Attorney, Agent, or Firm* — Sterne, Kessler, Goldstein & Fox P.L.L.C.

(57) ABSTRACT

A frequency adapter for synchronizing data transfers between a low-frequency module and a high-frequency module connected to an internal bus. The frequency adapter includes a low-to-high synchronization unit for synchronizing data transfers from the low frequency module to the high-frequency module, wherein the low-to-high synchronization unit is clocked by a low frequency clock; and a high-to-low synchronization unit for synchronizing data transfers from the high frequency module to the low-frequency module, wherein the high-to-low synchronization unit is clocked by a low frequency clock.

18 Claims, 6 Drawing Sheets

FREQUENCY ADAPTER UTILIZED IN HIGH-SPEED INTERNAL BUSES

TECHNICAL FIELD

The present invention relates generally to internal buses in application specific integrated circuits (ASICs), and more particularly to interfacing between high-frequency circuits and low-frequency circuits connected to the high-speed bus.

BACKGROUND OF THE INVENTION

In most computer systems, the function of communications between different components is typically performed by a bus. The bus architecture is designed to be well established and portable such that it can be utilized in multiple configurations without excessive additional development expenses when designing for derivative products. In addition, a bus is designed to perform high-speed communication processing to support increase in frequency of a processor's clock.

An application specific integrated circuit (ASIC) typically includes one or more core processors, one or more memory units, and other functional modules, all integrated on a single semiconductor ASIC (or chip). Having the modules on the same ASIC allows data to be easily and quickly transferred between the various modules. To provide high speed data transfers on an ASIC, specialized internal buses are designed specifically for this purpose. One example for such a specialized bus is the advanced high-performance bus (AHB), developed by ARM™ Ltd. The AHB operates in accordance with the advanced microcontroller bus architecture (AMBA) protocol and provides high-speed data transfers between various components on an ASIC. Another example is the advanced peripheral bus (APB), which provides the basic peripheral macro-cell communication infrastructure as a secondary bus from the higher bandwidth pipelined main system bus. The APB is designed to reduce interface complexity for supporting of peripheral functions. The limitations of the AHB, APB in addition to other types of internal buses are the inability to support inter-connection and inter-communication between the various modules on an ASIC.

Specifically, various modules of the ASIC typically operate at different clock frequencies. To support efficient inter-connection and inter-communication between such modules, there is a need to synchronize data transfers over the internal bus.

A straightforward approach for transferring data directly from a low-frequency module to a high-frequency module would result in low utilization of the bus, as the bus would be operative only when the low-frequency clock is active. In addition, transferring data from a high-frequency module to a low-frequency module without any synchronization means would result in losing data.

Therefore, it would be advantageous to provide an internal bus' frequency adapter to ensure efficient inter-connection and inter-communication among modules connected to the bus.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
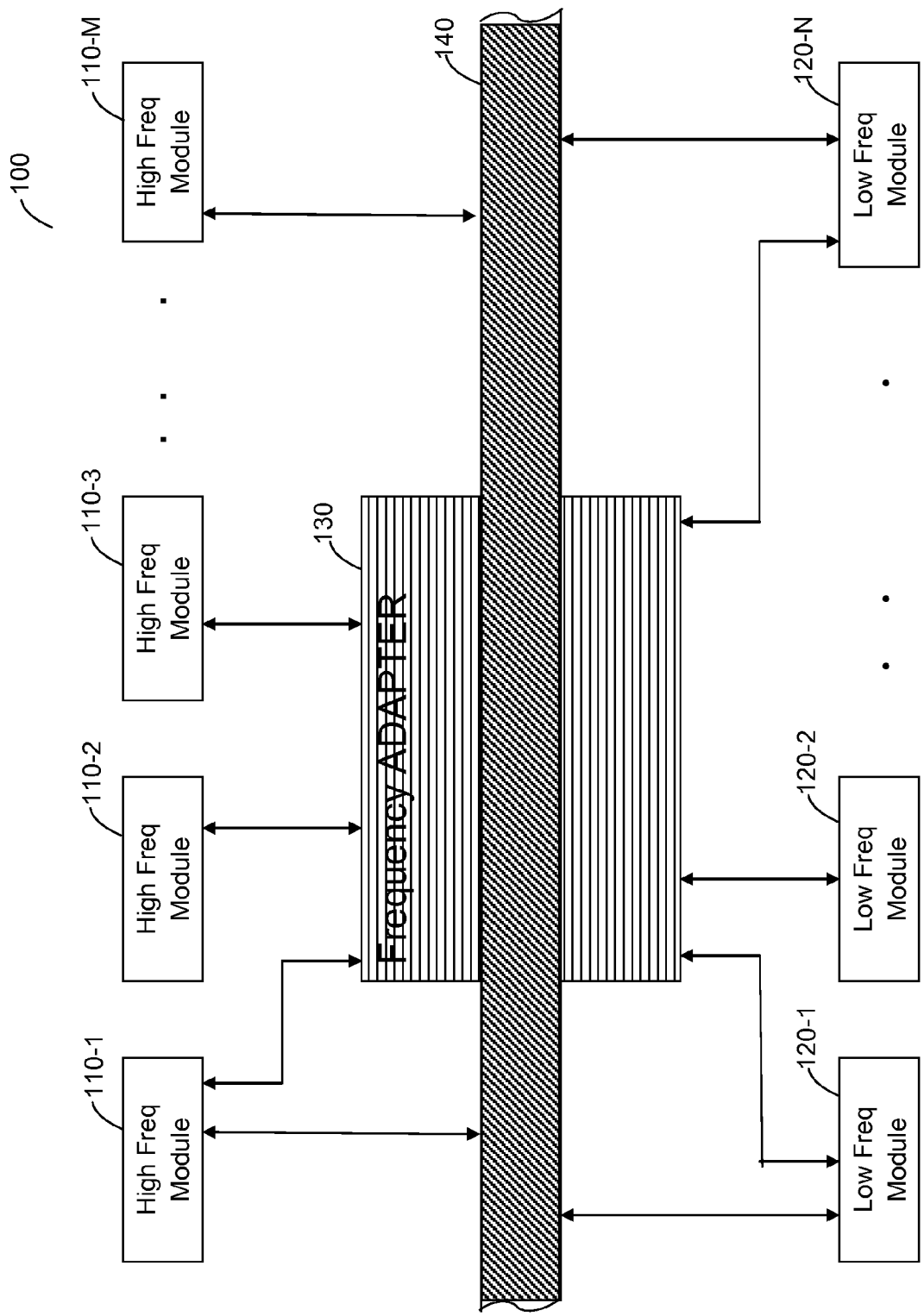
FIG. 1 is a diagram of an ASIC utilized to illustrate the principles of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a schematic diagram of an ASIC 100 utilized to describe the principles of the invention. The ASIC 100 includes a plurality of high-frequency modules 110-1 through 110-M (collectively referred to as a high-frequency module 110) and a plurality of low-frequency modules 120-1 through 120-N (collectively referred to as a low-frequency module 120). In an exemplary embodiment the clock's frequency of a high-frequency module 110 is twice as fast as a clock frequency of a low-frequency module 120. Each high-frequency module 110 is connected to a frequency adapter 130 to enable efficient communication with one or more of the low-frequency modules 120 and further to an internal bus 140, to communicate with one or more other high-frequency modules 110. Similarly, each low-frequency module 120 is connected to the frequency adapter 130 to enable efficient communication with one or more of the high-frequency modules 110 and further to the internal bus 140, to communicate with one or more other low-frequency modules 120.

In accordance with one embodiment of the invention the ASIC 100 is a network processor configured to process data packets compliant with at least a Gigabit passive optical network (GPON). In this embodiment the low-frequency modules are network adapters, i.e., interfaces to a GPON and an Ethernet network and high-frequency modules 110 include packet processors and various accelerators.

The internal bus 140 may be, but is not limited to, the AHB, APB, and the like. In accordance with an embodiment of the invention the internal bus 140 may have a similar architecture to a high-speed internal bus described in U.S. Pat. No. 7,370,127, assigned to common assignee and which is hereby incorporated by reference for the useful information that it contains. The high-speed bus discussed in the U.S. Pat. No. 7,370,127 patent is based on an architecture that includes multiple interface units for interfacing with modules of an ASIC and at least one basic modular unit coupled to the interface units for allowing simultaneous data transfers between the interface units. Each of the basic modular units has an upload unit for transferring upstream data and a download unit for transferring downstream data.

Figure 2:
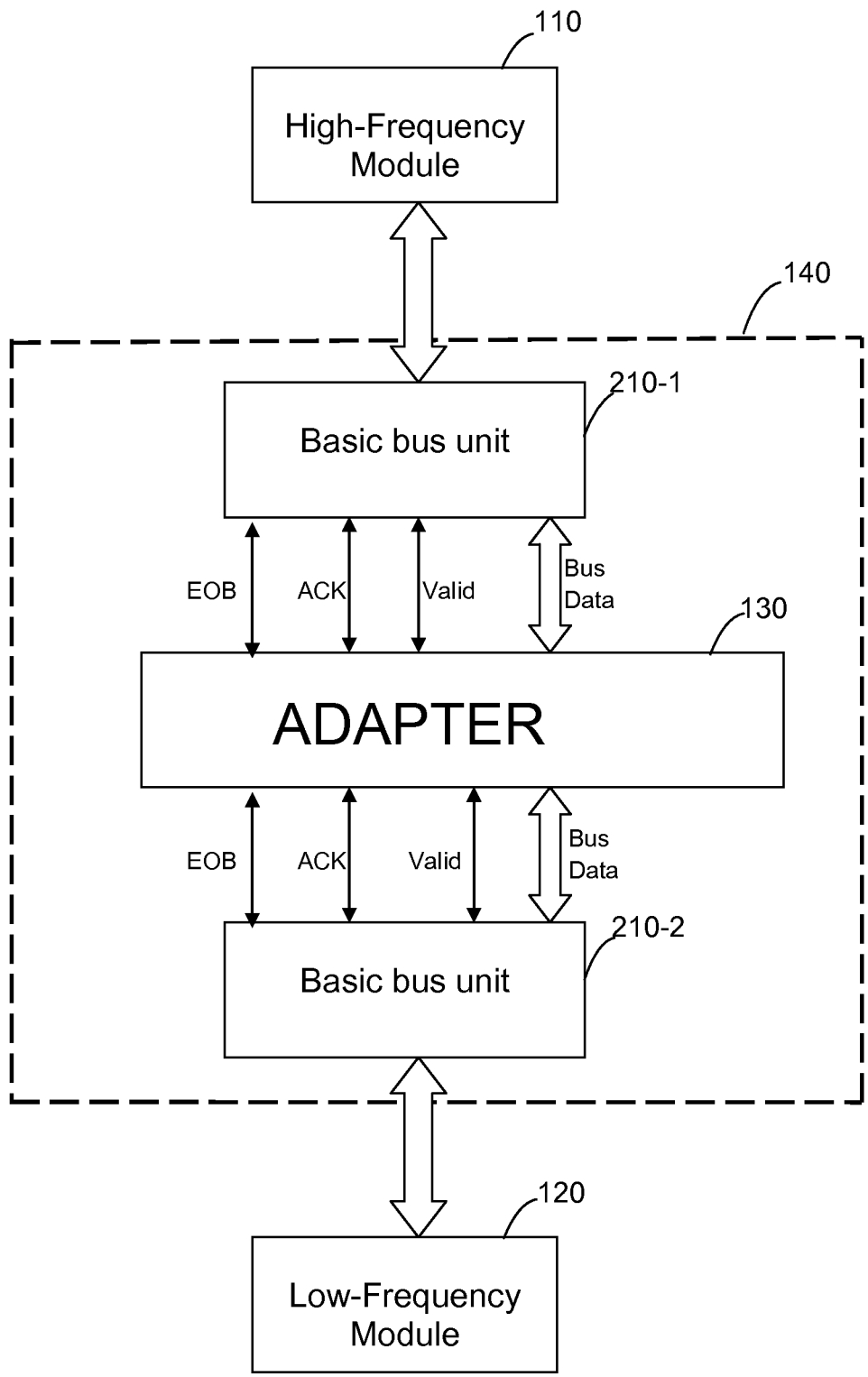
FIG. 2 is a diagram illustrating the connection of a frequency adapter to basic bus units.

As schematically shown in FIG. 1 and illustrated in detail in FIG. 2, the frequency adapter 130 is integrated in the internal bus 140. Specifically, a bus basic unit 210-1 interfaces between a high-frequency module 110 and the adapter 130 and a basic bus unit 210-2 interfaces between a low-frequency module 120 and the adapter 130. Each of the basic module units 210 receives bus data (including at least data packets, address and control signals) from the respective module, transfers the bus data to the adapter 130, and further generates an acknowledgment (ACK) signal indicating (when active) that it can receive data, an end of burst (EOB) signal, and a valid signal indicating that a transaction was successfully performed.

The frequency adapter 130 operates at two frequency domains (high and low) and is capable of synchronizing burst data transfers between modules 110 and 120. In accordance with certain principles of the invention when data flows from a low-frequency module 120 to a high-frequency module 110, data packets received from the low-frequency module 120 (through the basic bus unit 210-2) are collected until a complete data burst is assembled, and then all data packets in the data burst are written to high frequency module 110, through the basic bus unit 210-1. Data packets are transferred at a rate of the high frequency clock. In the opposite direction, data packets sent from the high-frequency module 110, through the basic bus unit 210-1, are sampled by a low-frequency module 120, at a sampling rate of the low-frequency clock. It should be noted that a typical architecture would include a plurality basic bus units connected directly to each other or connected through one or more adapters 130.

Figure 3:
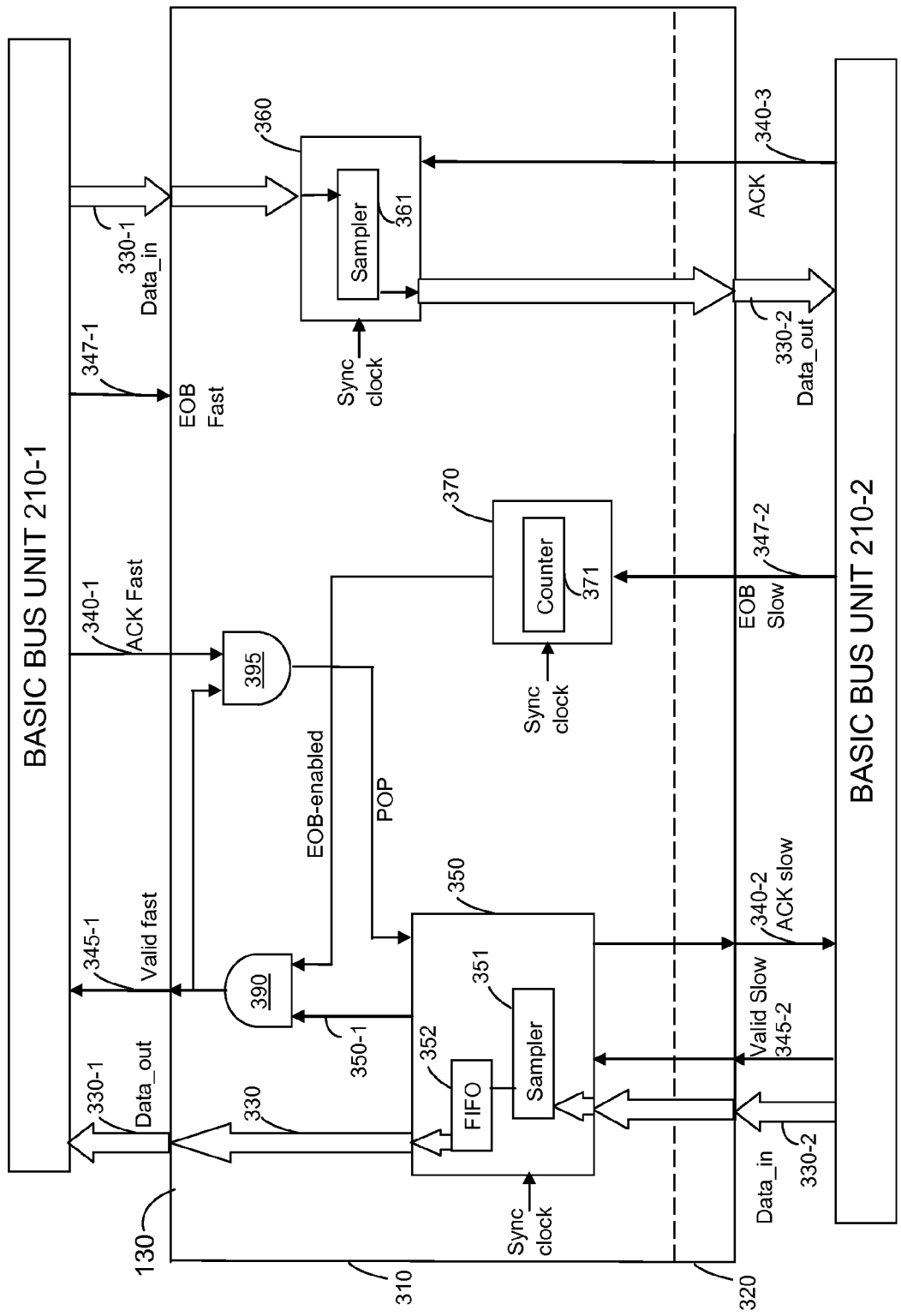
FIG. 3 is a block diagram of a frequency adapter constructed in accordance with one embodiment of the invention.

FIG. 3 shows a non-limiting and exemplary block diagram of the frequency adapter 130 constructed in accordance with an embodiment of the invention. The adapter 130 operates at two different frequency domains: high-frequency 310 and low-frequency 320, each of which is driven at a clock frequency as of the high-frequency module 110 and the low-frequency module 120 respectively. The adapter 130 interfaces with basic bus units 210-1 and 210-2 to receive and send data on buses 330-1 and 330-2 (i.e., data packets, address and control signals), ACK signals 340-1, 340-2 and 340-3, valid signals 345-1 and 345-2, and end of burst (EOB) signals 347-1 and 347-2. The frequency adapter 130 further includes a low-to-high synchronization unit 350, a high-to-low synchronization unit 360, and an end of burst (EOB) unit 370. These units are clocked by a synchronization (Sync) signal having a low clock frequency and are operable at the high frequency domain 310. The Sync signal is a logic signal which indicates the high-frequency domain 310 when a clock pulse/sampling event in the low-frequency domain 320 is about to happen.

The low-to-high synchronization unit 350 includes a sampler 351 for sampling data at a rate of the Sync signal and a first-in-first-out (FIFO) data structure 352. The FIFO 352 operates at a rate of the high-frequency clock. The high-frequency module 110 should receive continuous data burst, thus data packets received from the low-frequency module 120 (through basic bus unit 210-2) are collected at the FIFO 352 to assemble data packets belonging to a complete burst of data. The bus data 330-2, at the low-frequency side, is sampled at a rate of the Sync signal. An ACK slow signal 340-2 is asserted by the low-to-high synchronization unit 350 as long as the FIFO 352 is not full, thereby indicating to the basic bus unit 210-2 that additional data packets can be sent. When a valid slows signal 345-2 is asserted by the basic bus unit 210-2 data is written to the FIFO 352. Once an EOB slow signal 347-2 is received from the basic bus unit 210-2, the EOB unit 370 generates an EOB-enabled signal informing the basic bus unit 210-1 that a valid transaction is completed and that the number of data bursts saved in the FIFO 352 is greater than zero (0). With this aim, the EOB unit 370 includes an EOB counter 371 for counting the number of complete data bursts saved in the FIFO 352. The EOB unit 370 samples the EOB signal 347-2 at a sampling rate as of the Sync signal. Using the logic 390 a fast valid signal 345-1 is generated and output to the basic bus unit 210-1 when the value of the counter 371 is greater than zero (0) and the FIFO 352 is not empty as indicated by a signal 350-1 output by the synchronization unit 350.

The data packets belonging to a single burst are read from the FIFO 352 by the basic bus unit 210-1 when a POP signal is asserted. In accordance with one embodiment of the invention, the POP signal is asserted, by the logic 395, when the ACK fast signal 340-1 output by the basic bus unit 210-1 and the valid fast signal 345-1 are active. That is, the data is popped from the FIFO 352 only when there is a compete burst and the basic bus unit 210-1 is not full (i.e., ACK fast signal 340-1 is active).

Figure 4:
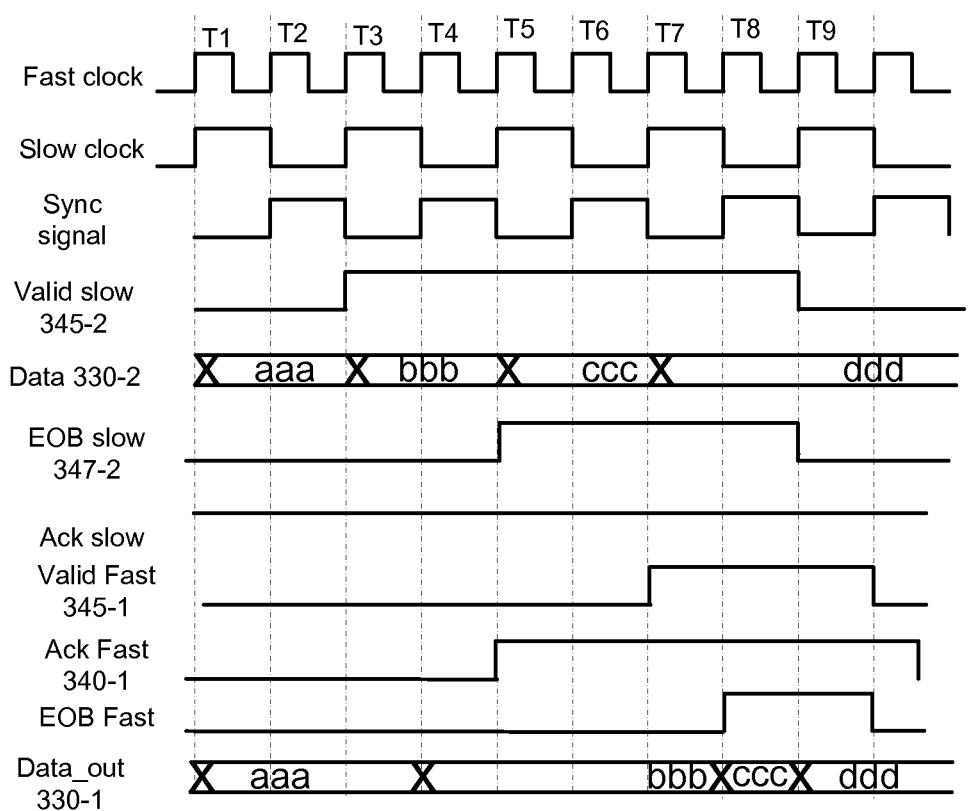
FIG. 4 is a timing diagram illustrating the operation of a high-to-low synchronization unit.

A non-limiting timing diagram illustrating the operation of the low-to-high synchronization unit 350 is provided in FIG. 4. At times T3, T4, T5, T6, T7 and T8 data on the bus 330-2 from the low frequency module 120 is written to the FIFO 352. During these times the valid slow signal 345-2 is active. The EOB slow signal 347-2 is asserted at time T5 after the complete data burst (designated as "bbb") is written to the FIFO 352. Data is transferred to the high-frequency module 110 at times T7, T8, and T9 during which the valid fast signal 345-1 and the ACK fast signal 340-2 are active (e.g., a high logic value). The data transferred on the bus 330-1 is designated as "bbb", "ccc", and "ddd". As can be noticed from the diagram provided at FIG. 4, the number of clock cycles (i.e., 4 cycles T3-T8) to read data from the low-frequency module 120 is twice the number of clock cycles (i.e., 2 cycles T7-T8) required to write data to the high-frequency module 110.

Figure 5:
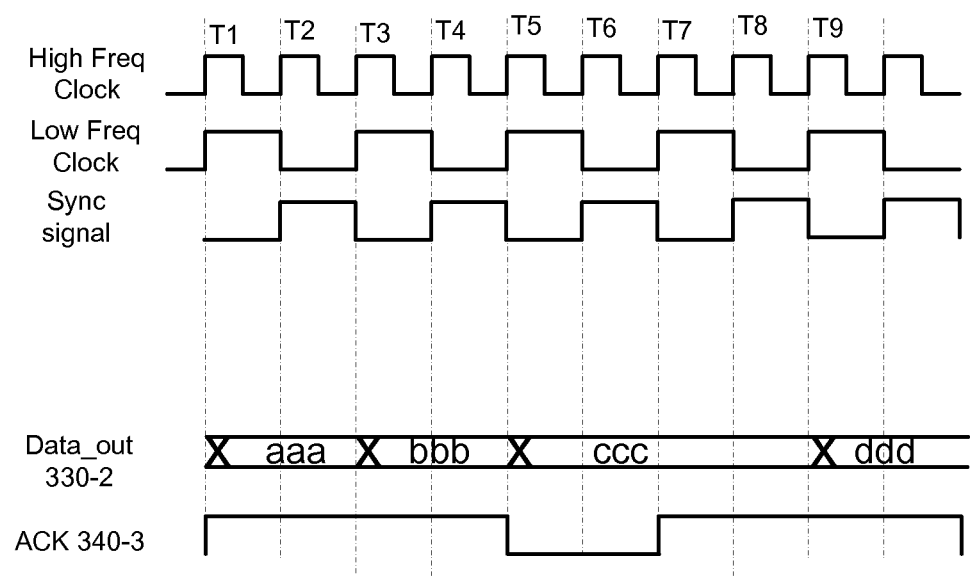
FIG. 5 is a timing diagram illustrating the operation of a low-to-high synchronization unit.

Referring back to FIG. 3. The high-to-low synchronization unit 360 includes a sampler 361 for sampling, at a rate of the Sync signal, data packets on the data_in bus 330-1. That is, data from the high-frequency module 110 is transferred to the low-frequency module 120 only when the Sync signal is active. In addition, the basic bus unit 210-2 can receive data from the basic bus unit 210-1 only when the ACK signal 340-3 asserted by the basic bus unit 210-2 is active. A non-limiting timing diagram illustrating the operation of the high-to-low synchronization unit 360 is provided in FIG. 5. Data is transferred from the high-frequency module 110 to the low-frequency module 120 respectively connected to the basic module units 210-1 and 210-2 at times T2, T4, and T8. At time T6, no data is transferred even though the Sync signal is active (e.g., having a high logic value), as the ACK signal 340-3 outputted by the basic unit bus unit 210-2 is inactive (e.g., having a low logic value).

Figure 6:
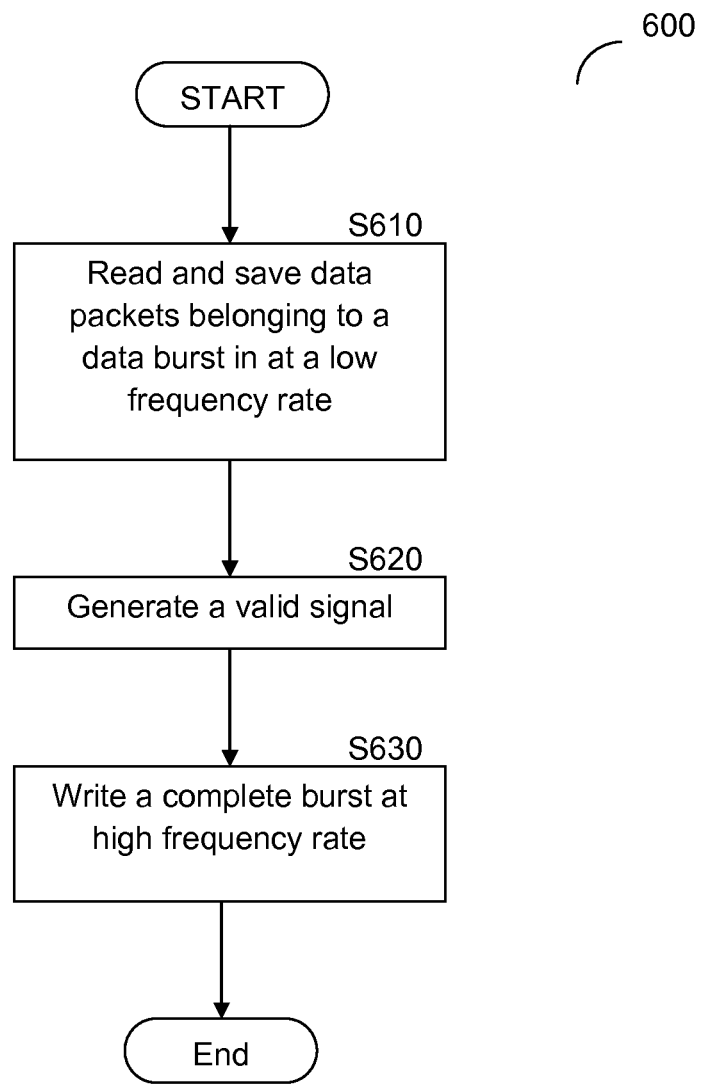
FIG. 6 is a non-limiting and exemplary flowchart describing a method for synchronizing data transfers from a low-frequency module to a high-frequency module over an internal bus implemented in accordance with an embodiment of the invention.

FIG. 6 shows a non-limiting and exemplary flowchart 600 describing the method for synchronization of data transfers from a low-frequency module to a high-frequency module over an internal bus implemented in accordance with an embodiment of the invention. At S610, data packets belonging to a data burst are saved in a temporary memory, e.g., a FIFO data structure. Data packets are sampled and written to the temporary memory at a rate of the low-frequency clock, i.e., the clock frequency of the low-frequency module. At S620, once an EOB signal is asserted by the low-frequency module, a valid signal is generated to indicate that a transaction of a data transfer initiated by the low-frequency module is completed. Thereafter, at S630, the data of a complete burst data is read and written, at a high frequency clock, to the high-frequency module. It should be appreciated that writing a complete burst data at a high frequency increases the utilization of the internal bus.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. One of ordinary skill in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What claimed is:

1. A frequency adapter for synchronizing data transfers between a low-frequency module configured to operate at a first frequency and a high-frequency module configured to operate at a second frequency, the second frequency being higher than the first frequency, comprising:
    a low-to-high frequency synchronization unit configured to receive a plurality of data bursts from the low-frequency module, each of the plurality of data bursts including a plurality of data packets, to store the plurality of data packets in a buffer, and to provide a signal indicative of whether the buffer is empty;
    an end of burst (EOB) unit configured to track a number of the plurality of data bursts stored in the buffer and to provide an EOB-enabled signal when the number is greater than zero;
    a first logic device configured to provide a valid fast signal based on the signal and the EOB-enabled signal; and
    a second logic device configured to provide a POP signal based on the valid fast signal and an acknowledgement (ACK) signal, the ACK signal being indicative that the high-frequency module is ready to receive data,
    wherein the low-to-high frequency synchronization unit is further configured to transfer the plurality of data packets from the buffer to the high-frequency module based on the POP signal.

2. The frequency adapter of claim 1, wherein the buffer comprises:
    a first-in-first-out (FIFO) buffer.

3. The frequency adapter of claim 1, wherein the low-to-high frequency synchronization unit is further configured to transfer the plurality of data packets to the high-frequency module in continuous data bursts.

4. The frequency adapter of claim 1, wherein the EOB unit is further configured to provide the EOB-enabled signal based on an EOB slow signal, the EOB slow signal being indicative of a valid data burst transaction at the low-frequency module.

5. The frequency adapter of claim 1, further comprising:
    a high-to-low-frequency synchronization unit configured to transfer another plurality of data packets from the high-frequency module to the low-frequency module in response to a second ACK signal, the second ACK signal being indicative that the low-frequency module is ready to receive data.

6. The frequency adapter of claim 5, wherein the high-to-low-frequency synchronization unit and the low-to-high frequency synchronization unit are respectively connected to a first basic bus unit and a second basic bus unit of an internal bus.

7. The frequency adapter of claim 1, wherein the low-to-high frequency synchronization unit is further configured to transfer the plurality of data packets from the buffer to the high-frequency module at a rate of the second frequency.

8. The frequency adapter of claim 1, wherein the second frequency is proportional to the first frequency.

9. In an integrated circuit, a method for synchronizing data between a first module and a second module operating at different frequencies, comprising:
    receiving a plurality of data bursts from the first module, each of the plurality of data bursts including a plurality of data packets;
    storing the plurality of data packets in a buffer;
    generating a signal indicative of whether the buffer is empty;
    tracking a number of the plurality of data bursts stored in the buffer;
    generating an end-of-burst (EOB)-enabled signal when the number is greater than zero;
    generating a valid fast signal based on a first logical AND operation of the signal and the EOB-enabled signal;
    generating a POP signal based on a second logical AND operation of the valid fast signal and an acknowledgement (ACK) signal, the ACK signal being indicative that the second module is ready to receive data; and
    transferring the plurality of data packets from the buffer to the second module based on the POP signal, the signal, and the EOB-enabled signal.

10. The method of claim 9, wherein the transferring comprises:
    transferring the plurality of data packets to the second nodule in continuous data bursts.

11. The method of claim 9, further comprising:
    transferring another plurality of data packets from the second module to the first module based on a second ACK signal, the second ACK signal being indicative that the first module is ready to receive data.

12. The method of claim 9, wherein the first module is configured to operate at a first frequency, wherein the second module is configured to operate at a second frequency, and wherein the transferring comprises:
    transferring the plurality of data packets from the buffer to the second module at a rate of the second frequency.

13. The method of claim 9, wherein the generating the EOB-signal comprises:
    generating the EOB-enabled signal based on an EOB slow signal,
    wherein the EOB slow signal is indicative of a valid data burst at the first module.

14. A frequency adapter for synchronizing data transfers between a first module and a second module operating at different frequencies, comprising:

a first frequency synchronization unit configured to receive a data burst from the first frequency module, the data burst including a plurality of data packets, and to store the plurality of data packets in a buffer;

a second frequency synchronization unit configured to transfer another plurality of data packets from the second module to the first module based on an acknowledgement (ACK) signal, the ACK signal being indicative that the first module is ready to receive the another plurality of data packets; and an end of burst (EOB) unit configured to track a number of the plurality of data bursts stored in the buffer and to assert an EOB-enabled signal when the number is greater than zero, wherein the first frequency synchronization unit is further configured to assert a signal when the buffer is not empty and to transfer the plurality of data packets to the second module when the signal and the EOB-enabled signal are asserted and the second module is ready to receive the plurality of data packets.

15. The frequency adapter of claim 14, wherein the first module is configured to operate at a first frequency, wherein the second module is configured to operate at a second frequency, and wherein the first frequency is proportional to the second frequency.

16. The frequency adapter of claim 15, wherein the first frequency synchronization unit comprises:

a sampler configured to sample the plurality of data packets at a rate of the first frequency, and wherein the buffer is further configured to store the plurality of data packets at the rate of the first frequency.

17. The frequency adapter of claim 16, wherein the first frequency synchronization unit is further configured to transfer the plurality of data packets from the buffer to the second module at a rate of the second frequency.

18. The frequency adapter of claim 16, wherein the first frequency synchronization unit is further configured to transfer the plurality of data packets to the second module in continuous data bursts.

* * * * *